(12) United States Patent
Muller et al.

(10) Patent No.: US 8,701,727 B2
(45) Date of Patent: Apr. 22, 2014

(54) TRUCK DRIVE TIRE

(75) Inventors: Philippe Joseph Auguste Muller, Champlon (BE); Lothar Braun, Bollendorf (DE); Laurent Luigi Domenico Colantonio, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/572,787

(22) Filed: Aug. 13, 2012

(65) Prior Publication Data

US 2013/0048179 A1 Feb. 28, 2013

Related U.S. Application Data

(60) Provisional application No. 61/529,449, filed on Aug. 31, 2011.

(51) Int. Cl.
| | |
|---|---|
| *C08L 7/00* | (2006.01) |
| *C08L 9/00* | (2006.01) |
| *C08K 3/36* | (2006.01) |
| *C08K 3/04* | (2006.01) |
| *B60C 11/00* | (2006.01) |
| *B60C 1/00* | (2006.01) |

(52) U.S. Cl.
CPC .......... *B60C 11/0041* (2013.01); *B60C 2200/06* (2013.01); *B60C 1/0016* (2013.01); *C08L 7/00* (2013.01); *C08L 9/00* (2013.01); *C08K 3/36* (2013.01); *C08K 3/04* (2013.01); *Y10S 152/905* (2013.01)
USPC .......... 152/450; 152/209.5; 152/905; 524/526

(58) Field of Classification Search
CPC .............. B60C 1/0016; B60C 11/0008; B60C 11/0005; B60C 11/0041; B60C 2200/06; C08L 7/00; C08L 9/00; C08L 9/06; C08K 3/36; C08K 3/04

USPC ................ 524/493, 526; 152/209.5, 450, 905
See application file for complete search history.

(56) References Cited

U.S. PATENT DOCUMENTS

| 7,028,734 B2 | 4/2006 | Ozel et al. ................... 152/209.5 |
| 2007/0144642 A1* | 6/2007 | Lukich et al. .............. 152/209.5 |

(Continued)

FOREIGN PATENT DOCUMENTS

| EP | 0738613 A1 | 10/1996 |
| EP | 0794073 A2 | 9/1997 |

(Continued)

OTHER PUBLICATIONS

KR 593005 B1 (2006), machine translation, KIPO Korean Patent Information Online Network (K-PION).*

(Continued)

*Primary Examiner* — Susannah Chung
*Assistant Examiner* — Josephine Chang
(74) *Attorney, Agent, or Firm* — John D. DeLong

(57) ABSTRACT

A pneumatic truck drive tire comprising a tread, the tread comprising a tread cap, a tread base, and a tread underlayer disposed between the tread cap and the tread base; the tread cap comprising a rubber composition comprising 100 part by weight, per 100 parts by weight of rubber (phr) of a rubber consisting of from 52 to 64 phr of polyisoprene rubber, from 22 to 27 phr of polybutadiene rubber, and from 13 to 21 phr of styrene-butadiene rubber; and 47 to 57 phr of carbon black; wherein the tread cap has a tan delta (100° C., 10% strain, 1 Hz) ranging from 0.13 to 0.16, a storage modulus (100° C., 1% strain, 1 Hz) ranging from 2 to 2.5 MPa, and a tear strength (100° C.) ranging from 19 to 23 N; the undertread comprising a rubber composition comprising 100 phr of a rubber consisting of from 71 to 86 phr of polyisoprene rubber and from 14 to 29 phr of polybutadiene rubber; from 19 to 23 phr of silica; and from 29 to 36 phr of carbon black wherein the undertread has a tan delta (100° C., 10% strain, 1 Hz) ranging from 0.1 to 0.14, a storage modulus (100° C., 1% strain, 1 Hz) ranging from 1.8 to 2.2 MPa, and a tear strength (100° C.) ranging from 28 to 34.

2 Claims, 1 Drawing Sheet

(56) References Cited

U.S. PATENT DOCUMENTS

2007/0185253 A1* 8/2007 Suzuki .................. 524/502
2009/0255613 A1* 10/2009 Zhang et al. .............. 152/209.5

FOREIGN PATENT DOCUMENTS

| | | | |
|---|---|---|---|
| EP | 0829380 | A2 | 3/1998 |
| EP | 1092565 | A1 | 4/2001 |
| EP | 1593528 | A1 * | 11/2005 |
| EP | 1897702 | A1 | 3/2008 |
| EP | 2039531 | A1 | 3/2009 |
| EP | 2366559 | A1 | 9/2011 |
| JP | 11060810 | A * | 3/1999 |
| JP | 2000109603 | A * | 4/2000 |
| JP | 2002019416 | A * | 1/2002 |
| JP | 2002019417 | A * | 1/2002 |
| JP | 2002019418 | A * | 1/2002 |
| KR | 593005 | B1 * | 6/2006 |

OTHER PUBLICATIONS

JP 11-060810 A (1999), machine translation, JPO Advanced Industrial Property Network (AIPN).*
JP 2000-109603 A (2000), machine translation, JPO Advanced Industrial Property Network (AIPN).*
JP 2002-019416 A (2002), machine translation, JPO Advanced Industrial Property Network (AIPN).*
JP 2002-019417 A (2002), machine translation, JPO Advanced Industrial Property Network (AIPN).*
JP 2002-019418 A (2002), machine translation, JPO Advanced Industrial Property Network (AIPN).*
EPO Search Report.

* cited by examiner

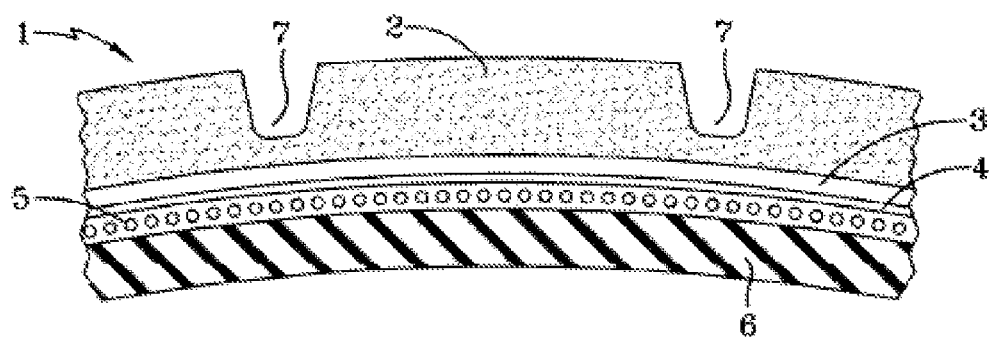

TRUCK DRIVE TIRE

This application claims the benefit of and incorporates by reference U.S. Provisional Application No. 61/529,449, filed Aug. 31, 2011.

BACKGROUND OF THE INVENTION

Heavy duty truck tires with a relatively thick tread region cross-section typically experience a significant heat build up and a corresponding increase in operating temperature as the truck tire is being used on an associated vehicle.

Such heavy duty tire internal heat buildup under heavy loads is considered herein to be significantly different from internal heat buildup generated in high performance light duty tires (e.g. passenger automobile tire and light duty truck tires). Heat build up in a heavy duty tire tread (e.g. heavy duty truck tire tread) during the working of such heavy duty tires under load can be of sufficient magnitude to cause such heavy duty tires to operate at relatively high temperatures and thereby have an impact upon their long term heat durability. Such heat buildup may also result from relatively high hysteresis in the tread compound, indicative of relatively higher rolling resistance and consequent fuel use.

A heavy duty tire is considered to be a tire having a minimum load bearing capacity of 4,000 pounds (1814 kg) and therefore is considered to be differentiated from a light duty tire having a maximum load bearing capacity of 3,500 (1587 kg), preferably a maximum load bearing capacity of 3,000 pounds (1361 kg). Reference: The Tire and Rim Association Handbook.

SUMMARY OF THE INVENTION

The present invention is directed to a pneumatic truck drive tire comprising a tread, the tread comprising a tread cap, a tread base, and a tread underlayer disposed between the tread cap and the tread base;

the tread cap comprising a rubber composition comprising 100 part by weight, per 100 parts by weight of rubber (phr) of a rubber consisting of from 52 to 64 phr of polyisoprene rubber, from 22 to 27 phr of polybutadiene rubber, and from 13 to 21 phr of styrene-butadiene rubber; and 47 to 57 phr of carbon black;

wherein the tread cap has a tan delta (100° C., 10% strain, 1 Hz) ranging from 0.13 to 0.16, a storage modulus (100° C., 1% strain, 1 Hz) ranging from 2 to 2.5 MPa, and a tear strength (100° C.) ranging from 19 to 23 N;

the undertread comprising a rubber composition comprising 100 phr of a rubber consisting of from 71 to 86 phr of polyisoprene rubber and from 14 to 29 phr of polybutadiene rubber;

from 19 to 23 phr of silica; and from 29 to 36 phr of carbon black;

wherein the undertread has a tan delta (100° C., 10% strain, 1 Hz) ranging from 0.1 to 0.14, a storage modulus (100° C., 1% strain, 1 Hz) ranging from 1.8 to 2.2 MPa, and a tear strength (100° C.) ranging from 28 to 34 N.

BRIEF DESCRIPTION OF THE DRAWINGS

The drawing illustrates a partial cross section of a truck drive tire according to the present invention.

DETAILED DESCRIPTION OF THE INVENTION

There is disclosed a pneumatic truck drive tire comprising a tread, the tread comprising a tread cap, a tread base, and a tread underlayer disposed between the tread cap and the tread base;

the tread cap comprising a rubber composition comprising 100 part by weight, per 100 parts by weight of rubber (phr) of a rubber consisting of from 52 to 64 phr of polyisoprene rubber, from 22 to 27 phr of polybutadiene rubber, and from 13 to 21 phr of styrene-butadiene rubber; and 47 to 57 phr of carbon black;

wherein the tread cap has a tan delta (100° C., 10% strain, 1 Hz) ranging from 0.13 to 0.16, a storage modulus (100° C., 1% strain, 1 Hz) ranging from 2 to 2.5 MPa, and a tear strength (100° C.) ranging from 19 to 23 N;

the undertread comprising a rubber composition comprising 100 phr of a rubber consisting of from 71 to 86 phr of polyisoprene rubber and from 14 to 29 phr of polybutadiene rubber;

from 19 to 23 phr of silica; and from 29 to 36 phr of carbon black;

wherein the undertread has a tan delta (100° C., 10% strain, 1 Hz) ranging from 0.1 to 0.14, a storage modulus (100° C., 1% strain, 1 Hz) ranging from 1.8 to 2.2 MPa, and a tear strength (100° C.) ranging from 28 to 34 N.

The drawing represents a partial cross-section of a truck drive tire (1) having a tread comprised of an outer tread cap carbon black and/or silica reinforced rubber layer (2) having grooves (7) and a running surface intended to be ground-contacting and underlying tread base carbon black and/or silica reinforced rubber undertread layer (3), together with tread base layer (4), which is exclusive of cord reinforcement, belt layer (5) and carcass (6). Undertread rubber layer is positioned between tread base layer (4) and tread cap (2).

To obtain the desired improvement in tire durability, certain properties of the tread cap and undertread layers are significant as shown in the following table of target property values.

| Target Properties | Tread Cap | Undertread |
|---|---|---|
| Tan Delta, (100° C., 10% strain, 1 Hz) | 0.13 to 0.16 | 0.1 to 0.14 |
| Storage Modulus (100° C., 1% strain, 1 Hz), MPa | 2 to 2.5 | 1.8 to 2.2 |
| Tear Strength (100° C.), N | 19 to 23 | 28 to 34 |

One or more components of the tire may comprise a rubber composition.

The rubber composition may be used with rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1, 4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 28 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36 percent. The S-SBR can be conveniently prepared, for example, by organo lithium catalyzation in the presence of an organic hydrocarbon solvent.

In one embodiment, cis 1,4-polybutadiene rubber (BR) may be used. Such BR can be prepared, for example, by organic solution polymerization of 1,3-butadiene. The BR may be conveniently characterized, for example, by having at least a 90 percent cis 1,4-content.

The cis 1,4-polyisoprene and cis 1,4-polyisoprene natural rubber are well known to those having skill in the rubber art.

The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. No. 6,242,534; 6,207,757; 6,133,364;

6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. Examples of suitable sulfur containing organosilicon compounds are of the formula:

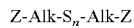   III in which Z is selected from the group consisting of

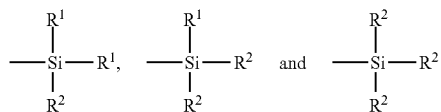

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl)polysulfides. In one embodiment, the sulfur containing organosilicon compounds are 3,3'-bis(triethoxysilylpropyl) disulfide and/or 3,3'-bis(triethoxysilylpropyl)tetrasulfide. Therefore, as to formula III, Z may be

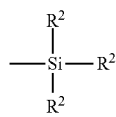

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap, undertread and tread base), sidewall, apex, chafer, sidewall insert, wirecoat or innerliner. In one embodiment, the component is an undertread layer.

The pneumatic tire of the present invention is a truck drive tire. By drive tire, it is meant that the tire is mounted on the drive wheels of a heavy truck, typically the rear wheels of the truck tractor. A typical eighteen-wheel truck comprises two steer tires, eight drive tires, and eight trailer tires. Of these, the drive tires account for about 47 percent of the rolling resistance of the truck, with fifteen percent coming from the steer tires and 38 percent from the trailer tires. Based on this, the biggest gain to fuel economy comes from rolling resistance reduction in the drive tires, with a six percent reduction in drive tire rolling resistance resulting in a one percent increase in fuel economy. By contrast, rolling resistance in steer tires must be reduced by twenty percent to obtain a one percent improvement in fuel economy, and rolling resistance in trailer tires must be reduced by eight percent to obtain a one percent improvement in fuel economy.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The invention is further illustrated by the following non-limiting example.

EXAMPLE 1

In this example, physical properties of two rubber compounds are illustrated. Rubber compositions for a tread cap and undertread according to the invention were prepared with a formulations within the guidelines of Table 1, with all amounts in phr. The compounds were cured and tested for various physical properties. The values of the measured physical properties were found to be within the guidelines of Table 2.

TABLE 1

| Tread Cap[1] | |
|---|---|
| Natural Rubber | 52-64 |
| Polybutadiene Rubber | 22-27 |
| Styrene-Butadiene Rubber | 13-21 |
| Carbon Black | 47-57 |
| Undertread[1] | |
| Natural Rubber | 71-86 |
| Polybutadiene Rubber | 14-29 |
| Carbon Black | 29-36 |
| Silica | 19-23 |

[1]Both the tread cap and the undertread compositions included standard amount of waxes, antidegradants, stearic acid, zinc oxide, accelerators, and sulfur.

TABLE 2

| | Tread Cap | Undertread |
|---|---|---|
| RPA2000[1] Cured 18 min @ 150° C. Test: @ 100° C., 1 Hz | | |
| G' 1% strain | 2-2.5 | 1.8-2.2 |
| G' 50% strain | 0.8-1 | 0.8-0.95 |
| Tan Delta 10% strain | 0.13-0.16 | 0.1-0.14 |
| Ring Modulus[2] Cure: 10 min @ 150° C.; Test: @ 23° C., Pulling Speed = 50 cm/min | | |
| Elongation % | 410-500 | 450-550 |
| 300% Modulus, MPa | 14-16.5 | 13-16 |
| Tensile Strength, MPa | 21-25 | 21-25 |
| Rebound Value, % (100° C.) | 57-69 | 59-71 |
| Shore A | 60-73 | 59-71 |
| Tear[3] Cure: 10 min @ 150° C.; Test: @ 100° C., Pulling Speed = 50 cm/min, Adhesion To = Itself | | |
| Tear Strength, N/mm | 19-23 | 28-34 |

[1]Data obtained according to Rubber Process Analyzer as RPA 2000 ™ instrument by Alpha Technologies, namely said tan delta and storage modulus (G') values determined for this Example at 100° C. test temperature, indicated percent strain and 1 Hertz.
[2]Data obtained according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[3]Data obtained according to a peel strength adhesion (tear strength) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument. Tear strength determined according to said tear strength test (peal strength adhesion test) is referred to herein as "Tear Strength".

EXAMPLE 2

In this example, a tire constructed with a tread cap compound and undertread compound according to the invention is illustrated. Two 315/80R22.5 tires were constructed as shown in Table 3. Tire 1 had a tread consisting of a tread cap according to Example 1, with no undertread. Tire 2 had a tread consisting of a tread cap and undertread according to Example 1. Both tire treads included a tread base underlying the other tread components.

TABLE 3

| Sample | Type | Cap | Undertread | Base |
|---|---|---|---|---|
| Tire 1 | Control | Yes | No | Yes |
| Tire 2 | Inventive | Yes | Yes | Yes |

The tires of Table 3 were tested for durability on a 120 inch diameter smooth steel drum (SWL 64). The tires were run at constant speed and inflation with zero slip and camber, with a load increase every 1200 km. Results are shown in Table 4 as the average of two tests.

TABLE 4

| Sample | Durability (km at end of test) |
|---|---|
| Tire 1 | 9000 |
| Tire 2 | 11000 |

As seen in Table 4, the inventive tires showed an increase in durability of 2000 km.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic truck drive tire comprising a tread, the tread comprising a tread cap, a tread base, and an undertread disposed between the tread cap and the tread base;
   the tread cap comprising a rubber composition comprising:
   100 part by weight, per 100 parts by weight of rubber (phr) of a rubber consisting of from 52 to 64 phr of polyisoprene rubber, from 22 to 27 phr of cis 1,4-polybutadiene rubber, and from 13 to 21 phr of styrene-butadiene rubber; and
   47 to 57 phr of carbon black;
   wherein the tread cap has a tan delta (100° C., 10% strain, 1 Hz) ranging from 0.13 to 0.16, a storage modulus (100° C., 1% strain, 1 Hz) ranging from 2 to 2.5 MPa, and a tear strength (100° C.) ranging from 19 to 23 N;
   the undertread comprising a rubber composition comprising:
   100 phr of a rubber consisting of from 71 to 86 phr of polyisoprene rubber and from 14 to 29 phr of cis 1,4-polybutadiene rubber;
   from 19 to 23 phr of silica; and
   from 29 to 36 phr of carbon black;
   wherein the undertread has a tan delta (100° C., 10% strain, 1 Hz) ranging from 0.1 to 0.14, a storage modulus (100° C., 1% strain, 1 Hz) ranging from 1.8 to 2.2 MPa, and a tear strength (100° C.) ranging from 28 to 34 N.

2. The pneumatic truck drive tire of claim 1, wherein the undertread rubber composition further comprises an organosilicon compounds are of the formula:

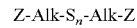

in which Z is selected from the group consisting of

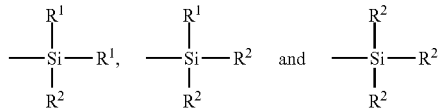

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

* * * * *